US011919644B2

(12) United States Patent
Agadi et al.

(10) Patent No.: US 11,919,644 B2
(45) Date of Patent: Mar. 5, 2024

(54) GALLEY EQUIPMENT HAZARDS ALERT

(71) Applicant: B/E Aerospace, Inc., Winston Salem, NC (US)

(72) Inventors: Sanjeevkumar Agadi, Bangalore (IN); Praveen Kumar Rai, Bangalore (IN)

(73) Assignee: B/E Aerospace, Inc., Winston Salem, NC (US)

( * ) Notice: Subject to any disclaimer, the term of this patent is extended or adjusted under 35 U.S.C. 154(b) by 69 days.

(21) Appl. No.: 17/584,122

(22) Filed: Jan. 25, 2022

(65) Prior Publication Data

US 2022/0234741 A1    Jul. 28, 2022

(30) Foreign Application Priority Data

Jan. 27, 2021  (IN) .............................. 202141003712

(51) Int. Cl.
| | | |
|---|---|---|
| *G08B 21/00* | (2006.01) | |
| *B64D 11/00* | (2006.01) | |
| *B64D 11/04* | (2006.01) | |
| *G08B 21/18* | (2006.01) | |
| *G08B 23/00* | (2006.01) | |

(52) U.S. Cl.
CPC .......... *B64D 11/04* (2013.01); *B64D 11/0007* (2013.01); *G08B 21/18* (2013.01)

(58) Field of Classification Search
CPC ...... B64D 11/04; B64D 11/0007; G08B 21/18
See application file for complete search history.

(56) References Cited

U.S. PATENT DOCUMENTS

| | | | | |
|---|---|---|---|---|
| 3,796,989 | A * | 3/1974 | Ravas ................ | G08B 13/1627 342/28 |
| 4,084,149 | A * | 4/1978 | Driver .................... | G01S 15/06 49/31 |
| RE30,288 | E * | 5/1980 | Hackett .............. | G08B 13/1618 342/194 |
| 8,686,876 | B2 * | 4/2014 | Shiomori ........... | B64D 11/0015 340/963 |
| 9,403,603 | B2 * | 8/2016 | Hozumi ............. | B64D 11/0007 |
| 9,434,474 | B2 | 9/2016 | Hothi | |

(Continued)

FOREIGN PATENT DOCUMENTS

| | | |
|---|---|---|
| DE | 102018200141 A1 | 7/2019 |
| JP | 2013116667 | 6/2013 |

OTHER PUBLICATIONS

Extended European Search Report for European Patent Application No. EP22153490.2, dated May 27, 2022.

*Primary Examiner* — Steven Lim
*Assistant Examiner* — Son M Tang
(74) *Attorney, Agent, or Firm* — Locke Lord LLP; Joshua L. Jones; Gabrielle L. Gelozin

(57) ABSTRACT

A system for securement of galley trolleys in aircraft comprises a motion sensor mounted to monitor a trolley in a trolley bay; a controller connected to the motion sensor, and an output device operatively connected to the controller. The controller is configured to receive a signal from the motion sensor to detect unsecured motion of a trolley in the trolley bay and the output device is configured to alert a user upon detection of unsecured motion of a trolley in the trolley bay. A method for securement of galley trolleys in aircraft includes monitoring a trolley in a trolley bay of an aircraft for motion and alerting a user upon unsecure motion of the trolley.

10 Claims, 3 Drawing Sheets

(56) References Cited

U.S. PATENT DOCUMENTS

| | | | |
|---|---|---|---|
| 9,624,693 B2 | 4/2017 | Vandewall et al. | |
| 9,725,033 B1 * | 8/2017 | Johannessen | B60Q 3/80 |
| 9,840,119 B1 * | 12/2017 | Melaragni | B60D 1/62 |
| 10,604,258 B2 * | 3/2020 | Singleton | B64D 11/0007 |
| 10,793,293 B2 * | 10/2020 | Christian | H04W 4/023 |
| 10,984,203 B1 * | 4/2021 | Huijsing | G06K 7/10297 |
| 11,535,379 B1 * | 12/2022 | Rajan | A47B 31/06 |
| 2006/0244577 A1 * | 11/2006 | Tanaka | B60R 25/1004 |
| | | | 340/429 |
| 2010/0045423 A1 * | 2/2010 | Glickman | H04N 7/181 |
| | | | 340/5.1 |
| 2011/0090064 A1 * | 4/2011 | Dahms | G06Q 10/00 |
| | | | 340/10.42 |
| 2013/0259612 A1 | 10/2013 | Guering | |
| 2013/0332323 A1 * | 12/2013 | Phillips | G06Q 10/087 |
| | | | 705/28 |
| 2014/0137574 A1 * | 5/2014 | Hothi | F25D 13/02 |
| | | | 62/62 |
| 2015/0014481 A1 * | 1/2015 | Vandewall | B64D 11/0007 |
| | | | 244/118.5 |
| 2015/0279189 A1 * | 10/2015 | Keene | G01V 11/002 |
| | | | 340/540 |
| 2016/0353551 A1 * | 12/2016 | Despres | H05B 47/125 |
| 2018/0044021 A1 | 2/2018 | Singleton et al. | |
| 2018/0224325 A1 * | 8/2018 | Lal | G01S 7/5276 |
| 2019/0082837 A1 * | 3/2019 | Kim | A47B 91/06 |
| 2019/0154872 A1 * | 5/2019 | Leduc | H04N 23/90 |
| 2019/0210730 A1 * | 7/2019 | Riedel | E05B 47/0009 |
| 2019/0241268 A1 * | 8/2019 | Iacobucci | B65F 1/1405 |
| 2019/0328156 A1 * | 10/2019 | Coetzee | A47F 3/001 |
| 2020/0039664 A1 | 2/2020 | Nicks | |
| 2020/0087077 A1 * | 3/2020 | Hartmann | B65G 11/203 |
| 2020/0181942 A1 * | 6/2020 | Bauer | E05B 41/00 |
| 2022/0144436 A1 * | 5/2022 | Dass | B62B 3/00 |

\* cited by examiner

GALLEY EQUIPMENT HAZARDS ALERT

CROSS-REFERENCE TO RELATED APPLICATIONS

This application claims priority to and the benefit of Indian Provisional Patent Application No. 202141003712, filed Jan. 27, 2021, the entire content of which is incorporated herein by reference.

BACKGROUND

1. Field

The present disclosure relates to aircraft interiors, and in particular to securement of trolleys such for aircraft galleys.

2. Description of Related Art

The galley is the compartment of an aircraft where food is cooked and prepared Aircraft galley systems have various trolley carts and cabinets that need to be secured in closed and stable positions during operation of aircraft. The cabinets may be positioned at various height levels which can cause a hazards during flight turbulence, flight takeoff, landing, and the like. The Federal Aviation Administration (FAA) regulations require secure locking of various galley carts and cabinet doors as explained above. Conventional locks used for galley carts and cabinets do not provide any information of the movement of trolley carts and cabinets in the galley if not properly locked or not stowed and secure.

The conventional techniques have been considered satisfactory for their intended purpose. However, there is an ever present need for improved systems and methods for monitoring galley inserts during flight. This disclosure provides a solution for this need.

SUMMARY

A system for securement of galley trolleys in aircraft comprises a motion sensor mounted to monitor a trolley in a trolley bay; a controller connected to the motion sensor, and an output device operatively connected to the controller. The controller is configured to receive a signal from the motion sensor to detect unsecured motion of a trolley in the trolley bay and the output device is configured to alert a user upon detection of unsecured motion of a trolley in the trolley bay.

The motion sensor can include an ultrasonic transmitter and an ultrasonic receiver, where the transmitter can be configured to interrogate a surface with ultrasonic waves and the receiver can be configured to receive a return of ultrasonic waves. The controller can be connected to the receiver and configured to receive a signal from the ultrasonic receiver and to monitor the return of ultrasonic waves for a Doppler shift indicative of unsecured trolley movement. The controller can be configured to compare a detected Doppler shift to a predetermined threshold, and can also initiate alerting a user via the output device if the Doppler shift in the return of ultrasonic waves exceeds the predetermined threshold. The controller can be configured to ignore Doppler shift below the predetermined threshold.

At least one of the controller and/or the motion sensor can include a phase comparator to compare phase of waves transmitted by the ultrasonic transmitter with waves received by the ultrasonic receiver for Doppler shift. The motion sensor can be mounted on a back wall of the trolley bay to monitor motion of a trolley away from the back wall, mounted on a galley wall opposite the trolley bay to monitor motion of a trolley toward the galley wall, mounted to be out of physical contact with the trolley with the trolley securely stowed in the trolley bay, and/or mounted to a top wall, bottom wall, or side wall of the trolley bay to monitor lateral and/or vertical motion of the trolley.

The output device can include a display, such that alerting a user can include displaying a message on the display indicative that a trolley bay door is open and/or that a trolley is loose. The output device can additionally or alternatively include at least one of a flashing light and/or an audible alarm configured to alert a user.

A method for securement of galley trolleys in aircraft includes monitoring a trolley in a trolley bay of an aircraft for motion and alerting a user upon unsecure motion of the trolley. Monitoring can include interrogating the trolley with ultrasonic waves and detecting Doppler shift in a return of the ultrasonic waves. Alerting can include issuing an alert upon detection of Doppler shift at or in excess of a predetermined threshold and ignoring Doppler shift below the predetermined threshold.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
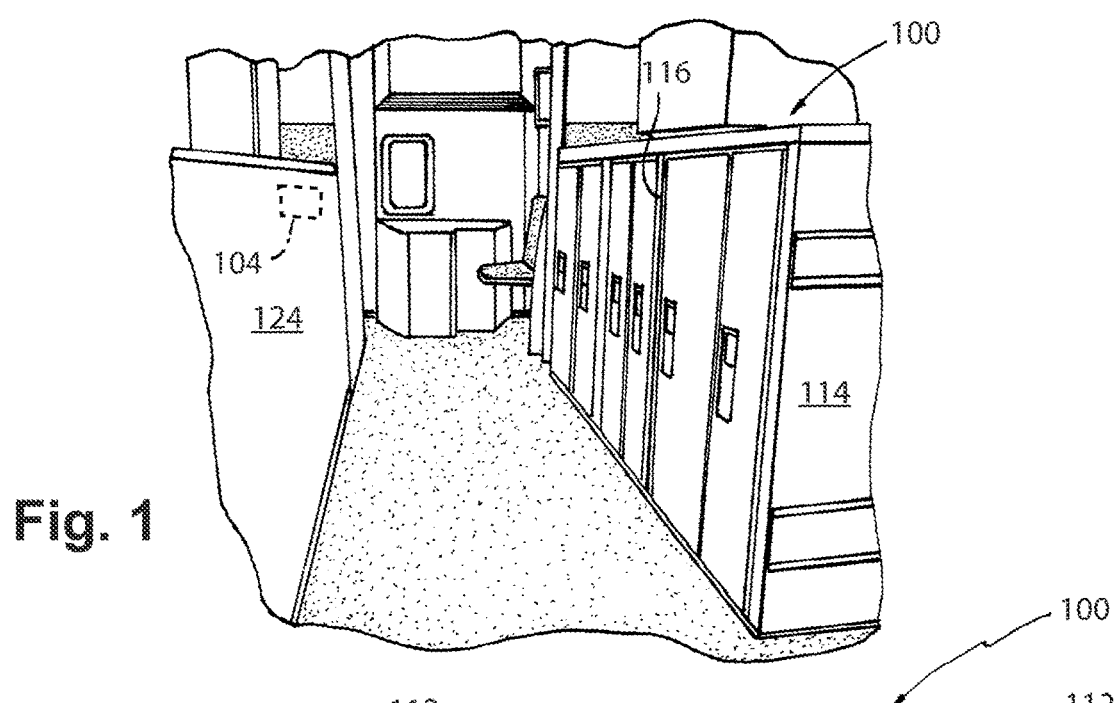
FIG. 1 is a schematic perspective view of an embodiment of a galley bay constructed in accordance with the present disclosure.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide remote monitoring of galley trolleys during flight.

Figure 2:
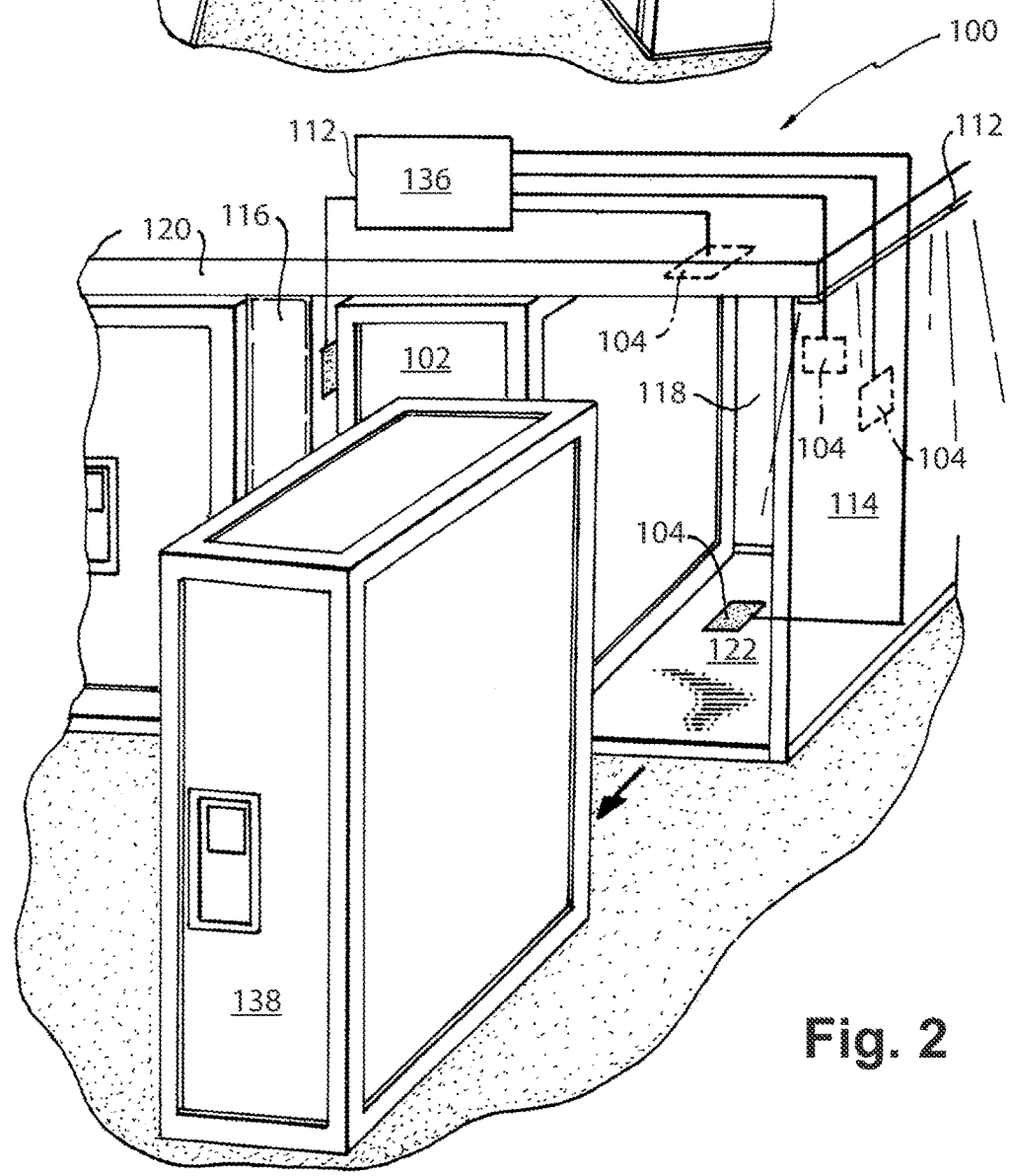
FIG. 2 is a schematic perspective view of an embodiment of a galley bay constructed in accordance with the present disclosure, showing a galley alert system.

Shown in FIGS. 1-2, a system 100 for securement of galley trolleys 102 in aircraft can include a motion sensor 104 mounted to monitor a trolley 102 in a trolley bay 108. A controller 110 can be connected to the motion sensor 104 and an output device 112 can be operatively connected to the controller 110. The controller 110 can be configured to receive a signal from the motion sensor 104 to detect motion of the trolley 102 in the trolley bay 108, such as unsecured motion due to a turbulence event for example. The output device 112 can be configured to alert a user 101 (e.g. crew member) when the motions sensor 104 detects of unsecured motion of the trolley 102.

The trolley bay 108 can include a plurality of sidewalls 114, 116, a back wall 118, and top and bottom walls 120, 122, and each of the trolleys 102 configured to stow therein can have corresponding side, back, top and bottom walls. In embodiments, the motion sensor 104 can be mounted on the back wall 118 of the trolley bay 108 to monitor motion of a trolley 102 away from the back wall, for example if the trolley 106 has moved forward and out of the trolley bay 108. Similarly, the motion sensor 104 can be mounted on a galley wall 124 opposite the trolley bay 108 to monitor motion of a trolley 102 toward the galley wall 124. While FIG. 1 shows galley wall 124 as a plain wall, it should be appreciated that galley wall 124 can also be a second row of galley bays, similar to galley bays 108 shown in FIG. 1. In embodiments, the motion sensor 104 can be mounted to be out of physical contact with the trolley 102 when the trolley 102 is securely stowed in the trolley bay 106. It is contemplated that the motion sensor 104 can be mounted to any or all of top wall 120, bottom wall 122, or side walls 114, 116 of the trolley bay 108, for example to monitor lateral and/or vertical movement of the trolley 102 within the bay 108.

Figure 3:
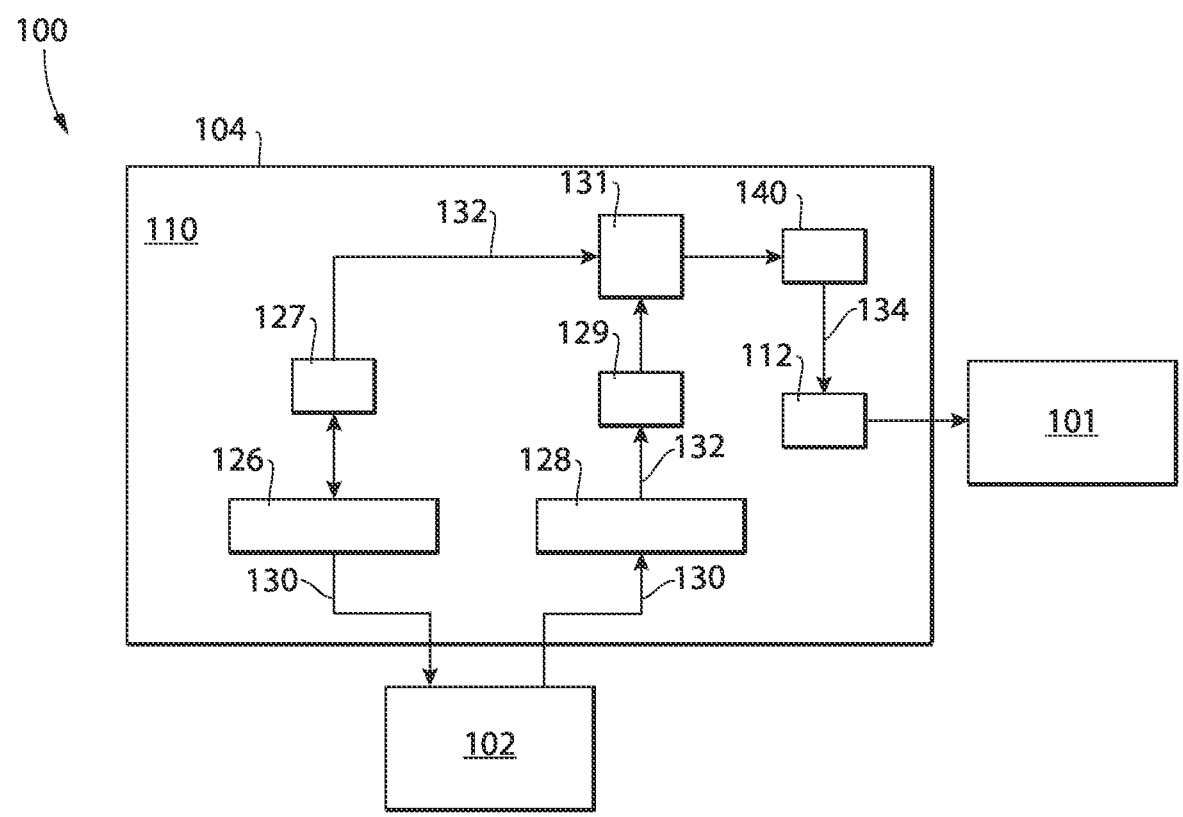
FIG. 3 is a schematic plan view of a the galley alert system of FIG. 1.

Shown in FIG. 3, the motion sensor 104 can include an ultrasonic transmitter 126 and an ultrasonic receiver 128. The transmitter 126 can be configured to interrogate a surface (e.g. any one of or all of the walls of the trolley 102) with ultrasonic waves 130 and the receiver 128 can be configured to receive a return of ultrasonic waves 130. The controller 110 can be connected to the receiver and configured to receive a signal 132 from the ultrasonic receiver 128 and monitor the return of ultrasonic waves 130 for a Doppler shift indicative of unsecured trolley movement.

For example, at least one of the controller 110 and/or the motion sensor 104 itself can include an oscillator 127, an amplifier 129 to amplify the signal 132 and a phase comparator 131 to compare phase of waves 130 transmitted by the ultrasonic transmitter 126 with waves received by the ultrasonic receiver 130 for Doppler shift. When monitoring the waves 130, the controller 110 can be configured to compare the detected Doppler shift to a predetermined threshold 140. If the if the Doppler shift in the returned ultrasonic waves 130 exceeds the predetermined threshold 140 (e.g. indicating the trolleys 102 are experiencing unsecure movement and/or the trolley bay doors are open and/or are unlocked), the controller 110 can initiate an alert 134 to alert a user 101 via the output device 112. If the Doppler shift is below the predetermined threshold 140 (e.g. indicating the trolleys 102 are secure), the controller 110 can be configured to ignore the shift and continue monitoring.

The output device 112 can include a display 136 (e.g. a graphical user interface on a personal electronic device), such that alerting a user 101 can include displaying a message (e.g. alphanumeric and/or graphical) on the display 136 indicative that a trolley bay door is open and/or that a trolley 102 is loose in the galley. The output device 110 can additionally or alternatively include at least one of a flashing light (as shown in FIG. 1) and/or an audible alarm (not shown) configured to alert a user 101 of the suspected movement of the trolley 102 without disrupting passengers.

Figure 4:
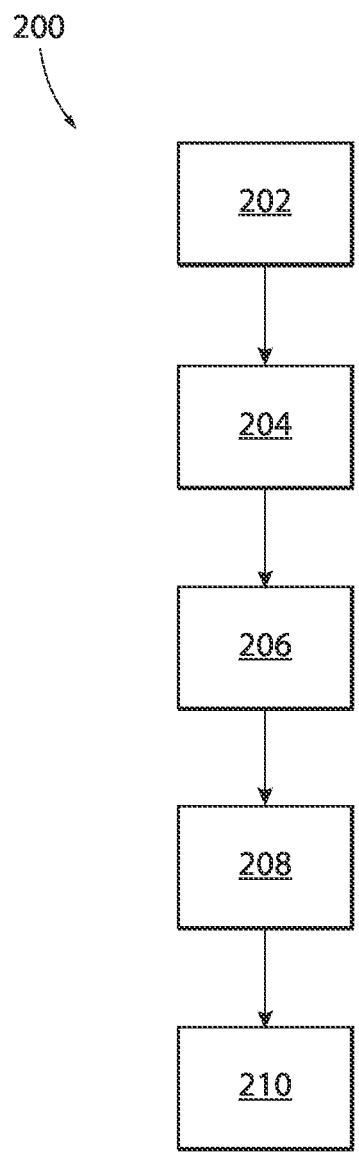
FIG. 4 is a schematic box diagram of a method in accordance with at least one embodiment of this disclosure.

As shown in FIG. 4, a method 200 for securing galley trolleys 108 in aircraft (e.g. in a galley) can include monitoring 202 a trolley 102 in a trolley bay 108 of an aircraft galley for motion. The method 200 can also include alerting 208 a user 101 upon unsecure motion of the trolley 102. Monitoring 202 can further include interrogating 204 the trolley 102 with ultrasonic waves 130 as described above for example, and detecting 206 Doppler shift in a return of the ultrasonic waves 130. Alerting 208 can further include issuing an alert 132 upon detection of Doppler shift at or in excess of a predetermined threshold 140. When the Doppler shift is below the predetermined threshold 140, the method 200 can include ignoring 210 the Doppler shift and continuing monitoring.

The methods and systems of the present disclosure, as described above and shown in the drawings, provide for enhanced remote monitoring of galley trolleys by crew members during flight without disrupting passengers, and allows for faster response time if the trolleys do experience unsecured movement to minimize damage to the trolleys and surrounding environment. While the apparatus and methods of the subject disclosure have been shown and described, those skilled in the art will readily appreciate that changes and/or modifications may be made thereto without departing from the scope of the subject disclosure.

What is claimed is:

1. A system for securement of galley trolleys in aircraft, the system comprising:
   a first motion sensor mounted on a back wall of a trolley bay configured to monitor forward and backward movement of a trolley in the trolley bay;
   a second motion sensor mounted on side wall of the trolley bay configured to monitor lateral movement of the trolley in the galley bay;
   a third motion sensor mounted to a galley wall, outside the gally bay and opposite a galley from the galley bay configured to monitor movement of the trolley outside of the galley bay;
   a controller operatively connected to the first motion sensor, the second motion sensor, and the third motion sensor, configured to receive a signal from the first motion sensor, the second motion sensor, and the third motion sensor to detect unsecured motion of the trolley in the trolley bay and to determine whether the trolley is loose in the galley outside of the trolley bay; and
   an output device operatively connected to the controller and configured to alert a user upon detection of unsecured motion of the trolley in the trolley bay or in the galley.

2. The system as recited in claim 1, wherein the first, second, and third motion sensors include an ultrasonic transmitter and an ultrasonic receiver configured to interrogate a surface with ultrasonic waves and to receive a return of ultrasonic waves.

3. The system as recited in claim 2, wherein the controller is connected to the ultrasonic receiver to receive a signal from the ultrasonic receiver and to monitor the return of ultrasonic waves for a Doppler shift indicative of unsecured trolley movement.

4. The system as recited in claim 3, wherein the controller is configured to compare a detected Doppler shift to a predetermined threshold, and to initiate alerting a user with the output device if the Doppler shift in the return of ultrasonic waves exceeds the predetermined threshold.

5. The system as recited in claim 4, wherein the controller is configured to ignore Doppler shift below the predetermined threshold.

6. The system as recited in claim 4, wherein at least one of the controller and/or the motion sensor includes a phase comparator for comparing phase of waves transmitted by the ultrasonic transmitter with waves received by the ultrasonic receiver for Doppler shift.

7. The system as recited in claim 1, wherein the motion sensor is mounted to be out of physical contact with the trolley with the trolley securely stowed in the trolley bay.

8. The system as recited in claim 1, further comprising a fourth motion sensor is-mounted to a top wall or a bottom wall of the trolley configured to monitor vertical motion of the trolley within the trolley bay.

9. The system as recited in claim 1, wherein the output device includes a display, wherein alerting a user includes displaying a message on the display indicative of at least one of: a trolley bay door is open and/or a trolley is loose.

10. The system as recited in claim 1, wherein the output device includes at least one of a flashing light and/or an audible alarm configured to alert a user.

* * * * *

UNITED STATES PATENT AND TRADEMARK OFFICE
CERTIFICATE OF CORRECTION

PATENT NO. : 11,919,644 B2
APPLICATION NO. : 17/584122
DATED : March 5, 2024
INVENTOR(S) : Sanjeevkumar Agadi It is certified that error appears in the above-identified patent and that said Letters Patent is hereby corrected as shown below:

In the Claims

Claim 8, at Column 5, Line 5 please delete "is-" preceding the word "mounted"

Signed and Sealed this
Eleventh Day of June, 2024

Katherine Kelly Vidal
*Director of the United States Patent and Trademark Office*